United States Patent [19]

McKirdy

[11] 4,316,363

[45] Feb. 23, 1982

[54] TEMPERATURE CONTROL SYSTEM

[76] Inventor: Ian D. McKirdy, 6 Kirkriggs Ave., Rutherglen, Glasgow, Scotland

[21] Appl. No.: 149,035

[22] Filed: May 12, 1980

[30] Foreign Application Priority Data

May 12, 1979 [GB] United Kingdom .............. 16574/79

[51] Int. Cl.³ ............................................. F25D 17/06
[52] U.S. Cl. ........................................ 62/89; 62/412; 98/31
[58] Field of Search .................. 62/89, 90, 259.1, 410, 62/411, 412; 98/31

[56] References Cited

U.S. PATENT DOCUMENTS

| | | | |
|---|---|---|---|
| 2,118,949 | 5/1938 | Scott | 62/412 X |
| 2,293,482 | 8/1942 | Ambrose | 62/324.1 |
| 2,376,859 | 5/1945 | Benn | 62/259.1 |
| 2,462,557 | 2/1949 | Santee | 62/259.1 |
| 2,793,508 | 5/1957 | Mueller | 62/259.1 |
| 3,732,703 | 5/1973 | Nordstrom et al. | 62/151 |
| 4,020,989 | 5/1977 | Kautz | 98/31 |
| 4,103,598 | 8/1978 | Cooper | 98/31 |

*Primary Examiner*—Lloyd L. King
*Attorney, Agent, or Firm*—Robert B. Frailey

[57] ABSTRACT

A temperature control system which can be used for regulating the temperature within a building while at the same time providing ventilation by means of providing refrigeration apparatus having a heating and cooling section and passing incoming air over one of the sections and outgoing air over the other section whereby heat taken in by the refrigeration apparatus from one of the air flows is transferred to the other air flow with preheating and precooling of the air flows by guiding them against opposite faces of the wall of the building before passage over the sections of the refrigeration apparatus.

8 Claims, 7 Drawing Figures

TEMPERATURE CONTROL SYSTEM

This invention relates to a temperature control system for a walled space.

A walled space in the context of the present invention can be any enclosure within which the temperature is to be controlled. It may be for example a building or an area within a building, or the passenger compartment of a vehicle.

In the present climate of apparently dwindling energy resources there has grown an increasing awareness of the need for energy conservation, leading to a greater use of, for example, double glazing and cavity wall insulation and other insulation in domestic, industrial and commercial premises. While such measures reduce the amount of heat loss from the premises to the atmosphere, they do not assist in ventilation, with the result that a degree of heat loss is necessarily incurred in ventilating the premises.

It has been proposed to recover heat in industrial processes which expend heat at a sufficiently high temperature to allow heat transfer to another medium. Normally this involves the use of passive heat exchangers, but it has been suggested that semi-active devices such as the thermal wheel may provide more efficient heat recovery. A problem then arises in reducing to a minimum the amount of energy required to drive the heat exchanger in order that a net saving of energy is obtained.

In the present invention a heat pump system is adopted in view of its benefits of providing a relatively large amount of heat with low primary energy consumption.

According to the present invention there is provided a temperature control system for a walled space comprising refrigeration apparatus having a cooling section and a heating section, inlet ducting arranged for conducting air from outside the walled space to its inside past one of the said sections of the refrigeration apparatus, and outlet ducting arranged for conducting air from inside the walled space to its outside past the other said section of refrigeration apparatus.

The inlet and outlet ducting each have an inlet end and an outlet end, and means are provided at the inlet end of at least one of the inlet and outlet ducting for guiding air into heat exchange relationship with the wall prior to entering the ducting. In this way heat is recovered from unavoidable heat conduction through the wall by using the wall itself as a passive heat exchanger between incoming air and outgoing air.

Where the inside temperature is to be higher than the outside temperature, as in winter conditions, the inlet ducting leads the air past the heating section of the refrigeration apparatus while the outlet ducting leads the air past the cooling section. Stale warm air from inside is therefore vented to the outside, but only after its heat has been extracted.

The guiding means may be for example partitioning spaced from the wall to form an air gap, and air is led along the air gap to the inlet ducting.

Further according to the present invention there is provided a method of controlling the temperature inside a walled space, comprising providing refrigeration apparatus having a cooling section and a heating section, leading air from outside the walled space past one of said sections to alter its temperature and thence into the walled space, and simultaneously leading air from inside the walled space past the other of said sections to alter its temperature and thence out of the walled space.

The system, including the refrigeration apparatus, can be in the form of a self-contained unit which can be located in an aperture formed in the wall; in this way the unit may be removable so that it can be reversed in summer conditions, whereby the inside of a building or other space can be maintained cooler than the outside.

It is preferable for the cooling and heating sections of the refrigeration apparatus to be disposed at outlet ends of the respective ducting, so as to achieve maximum heat recovery and minimise loss.

Fans can if necessary be disposed in the ducting to create air flow, but convention currents may be relied on in many cases thus reducing the energy input for the system.

A refrigeration cycle in this invention is one which when supplied with energy for motivation is capable of absorbing or extracting heat from some part of its environment and rejecting that heat, together with the heat equivalent of the motivating energy, to some other part of its environment at a higher temperature than that temperature at which the heat was absorbed. The heating section is that part of the cycle in which heat is rejected to the environment, while the cooling section is that part in which heat is absorbed from the environment.

Embodiments of the invention will now be described by way of example with reference to the accompanying drawings, in which.

Figure 1:
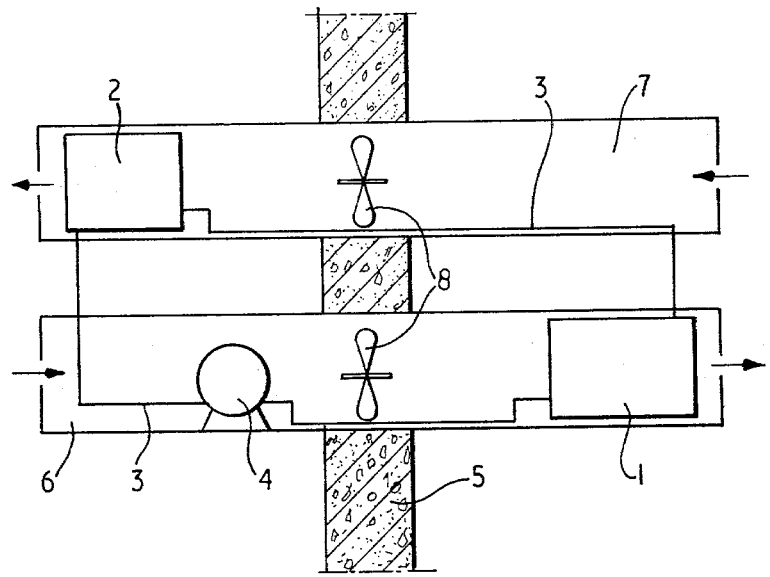
FIGS. 1 to 3 are schematic sectional views of alternative temperature control systems of the invention with the guiding means omitted.

In FIGS. 1, 2, 3, and 4, the system has a refrigeration cycle having a heating section formed by a condenser 1, and a cooling section formed by an evaporator 2, interconnected by pipes 3 for passage of fluid. A compressor 4 is included in the cycle in the pipe between the evaporator 2 and the condenser 1, and an expansion valve is included in the pipe between the condenser 1 and the evaporator 2. The system is located in a wall 5 of a building or other enclosed space. The condenser 1 is within an inlet duct 6 and the evaporator 2 is within an outlet duct 7.

Figure 2:
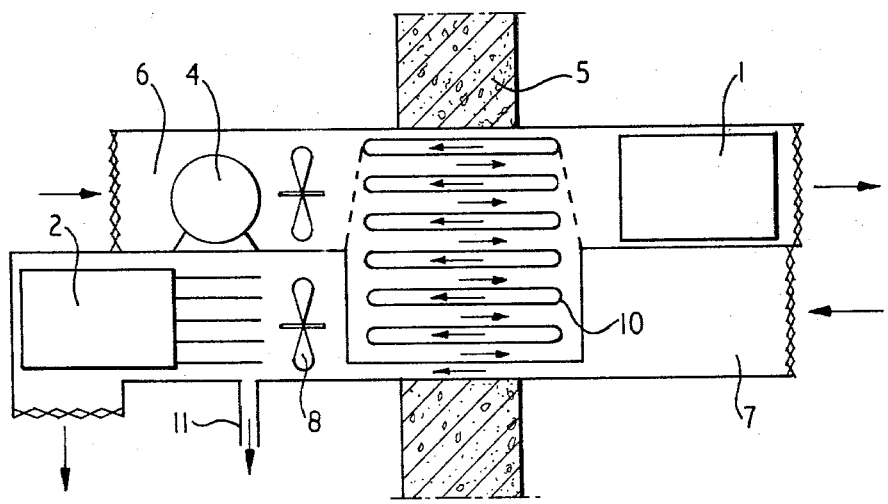
Figure 3:
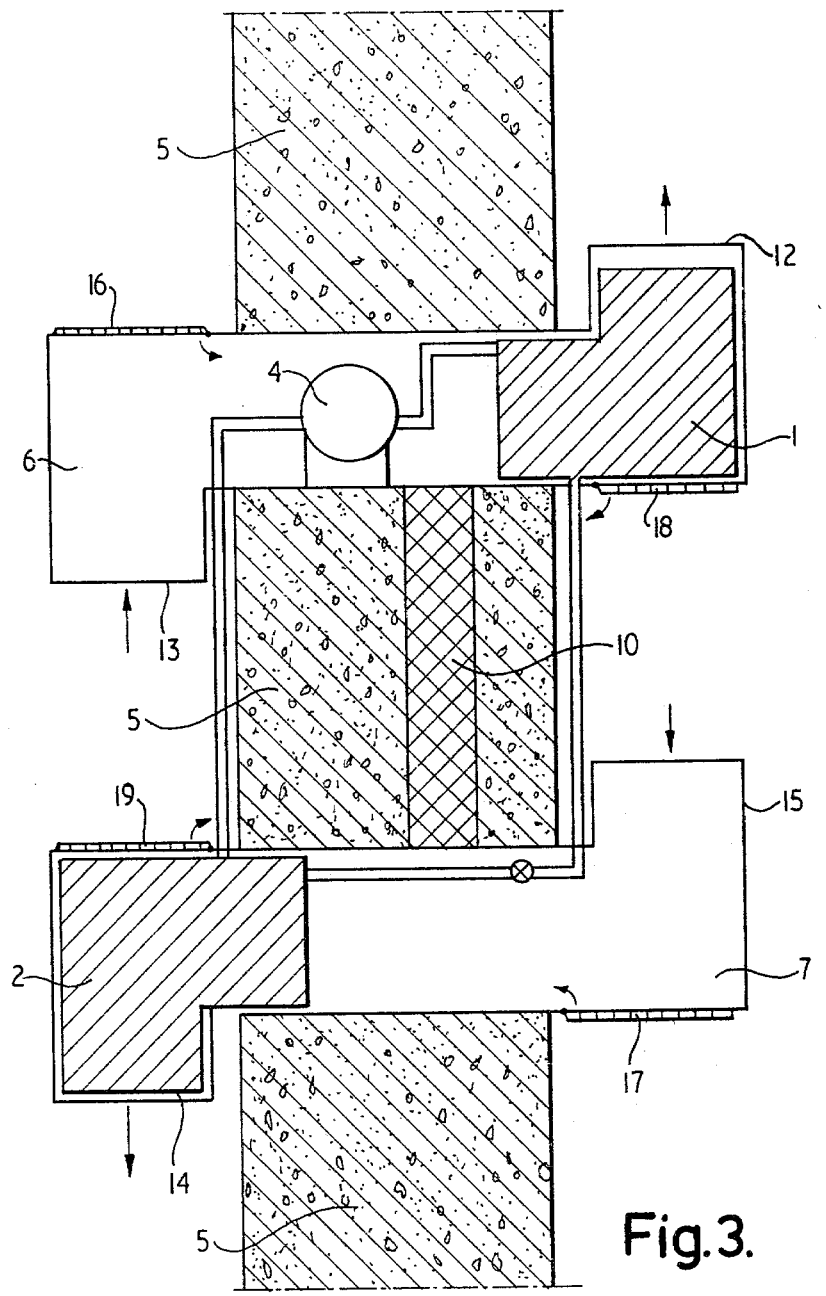
Figure 4:
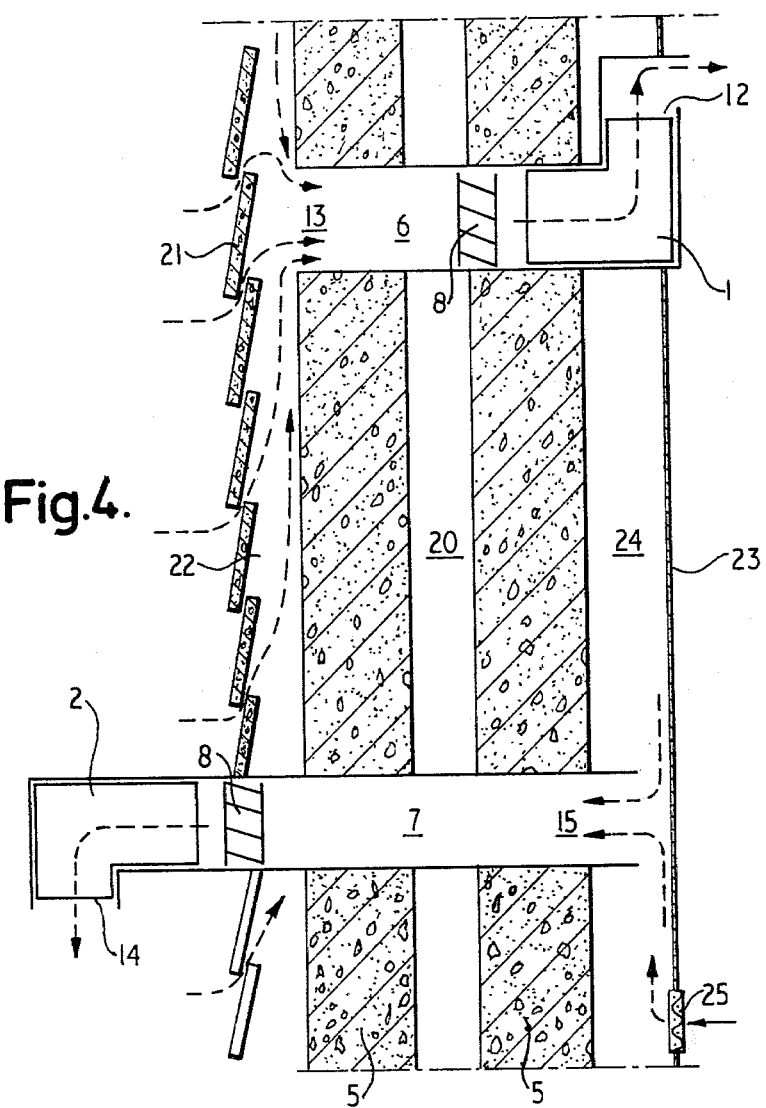
FIG. 4 is a schematic sectional view of a further system of the invention.

In FIGS. 1, 2 and 4, electrically-driven fans 8 are provided within the ducts 6 and 7 to create flows of air through them, while in FIG. 3 the air flows are created by convection currents induced by the configuration of the ducts 6 and 7.

FIG. 1 represents a basic heat pump system in which air is drawn into the inlet duct 6 by the action of its fan 8 and passes over the condenser 1, where it is heated. The heated air then emanates from the inlet duct 6 into the space 9 to be heated. Simultaneously, air is drawn into the outlet duct 7 by the action of its fan 8 and passes over the evaporator 2, where it is cooled. The cooled air then issues from the outlet duct.

The heat removed from the air by the evaporator 2 in the outlet duct is used in the refrigeration cycle to evaporate a liquid which then flows through the pipe 3 to the compressor 4 where the resulting vapour is compressed.

From there the compressed vapour passes to the condenser 1 where it condenses to a liquid, giving off its latent heat to the incoming air in the duct 6. The resulting liquid at high pressure then passes through the expansion valve in the pipe 4 to reduce its pressure and returns to the evaporator 1, thus completing the cycle.

In FIG. 2 the same operation occurs, but in this case a heat exchanger 10 is located between the ducts 6 and 7, with the effect that the air in the inlet duct 6 is preheated by the air in the outlet duct 7 before passing into the condenser 1; similarly the air in the outlet duct 7 is precooled by the air in the inlet duct 6 before entering the evaporator 2. This heat exchange allows the system to work more efficiently as less heat needs to be given out by the condenser 1, or taken in by the evaporator 2.

In FIG. 2 a drain outlet 11 is provided from the outlet duct 7 for removal of liquid condensate.

In FIG. 3 the outlet end 12 of the inlet duct 6 faces upwardly so that air heated at the condenser 1 leaves the duct 6 by convection, with the result that cold air is drawn into the duct 6 at its inlet end 13. Similarly, the outlet end 14 of the outlet duct 7 faces downwardly so that air cooled at the evaporator 2 leaves the duct 7 by convection thus drawing warm stale air into the inlet end 15 of the duct 7. The need for the fans 8 of FIGS. 1 and 2 is therefore removed.

The walls of the ducts 6 and 7 of FIG. 3 are provided with hinged flaps 16, 17, 18 and 19. The flaps 16 and 18 can move in the direction of the arrows to block off the flow of air through the ducts 6 and 7 respectively, while the flaps 17 and 19 can move to provide vertical pathways for air past the condenser 1 and evaporator 2 respectively. By moving all four flaps in this manner the system operates to remove heat from air by the evaporator 2 and transfer that heat via the condenser 1 to the other side of the wall 5. Ventilation is thus cut off by the flaps 16 and 18 and the system then acts solely as a heater/cooler arrangement.

In FIG. 4, the wall 5 is double thickness with an internal cavity 20. A slatted facade outer wall 21 is provided over the external face of the wall 5 and spaced from it to form an air gap 22, and a wallboard partition 23 is provided over the internal face of the wall 5 to form an air gap 24. The outlet ends 12 and 14 of the ducts 6 and 7 extend through the facade wall 21 and partition 23 respectively, while the inlet ends 13 and 15 receive air from the air gaps 22 and 24 respectively.

Air entering the inlet duct 6 filters through the slats of the facade wall 21 and passes over the surface of the wall 5 before entering the duct 6. The air is thus slightly preheated by heat exchange with the wall 5.

Air entering the outlet duct 7 passes into the air gap 24 through a grille 25 in the partition 23 and then undergoes heat exchange with the inner face of the wall 5 before entering the duct 7. This air is thus slightly cooled before entering the duct 7.

The heat exchange of incoming and outgoing air with the wall 5 increases the efficiency of the system in similar manner to the heat exchanger 10 of FIGS. 2 and 3.

Figure 5:
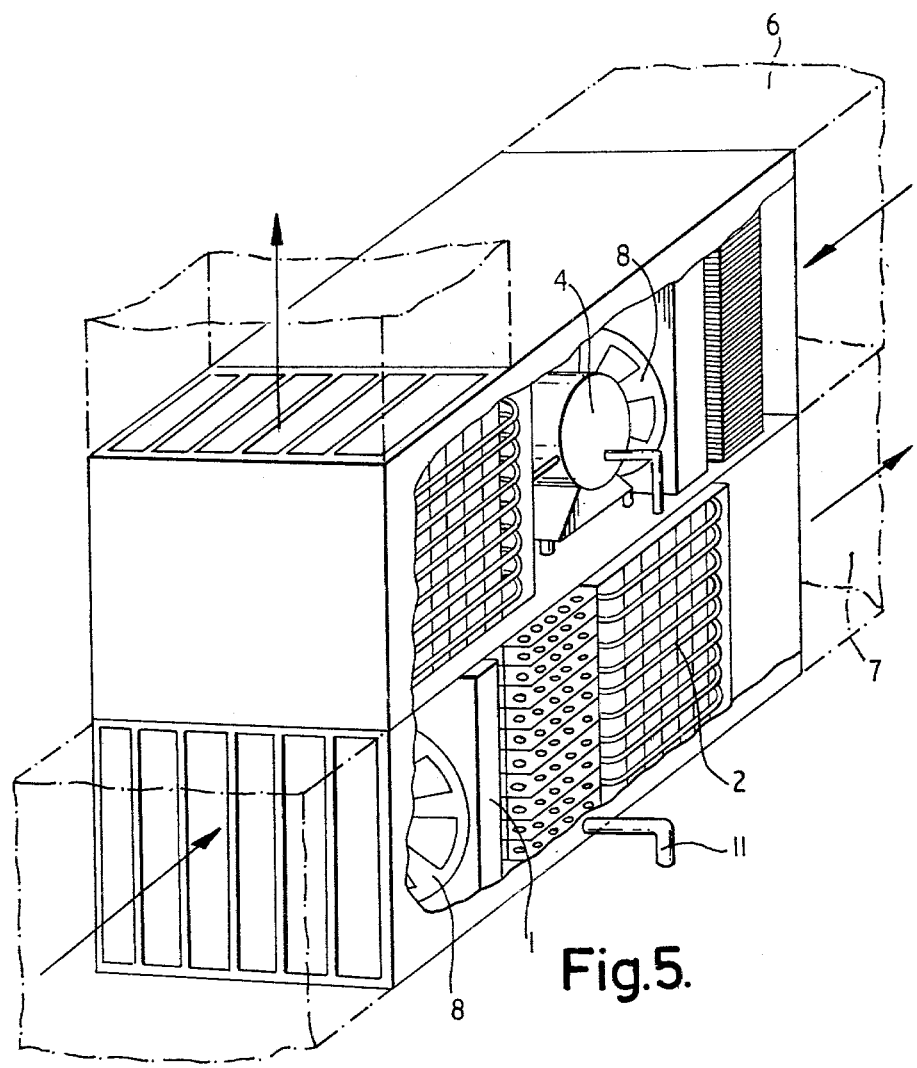
FIGS. 5 and 6 are part-sectional perspective views of refrigeration apparatus for use in systems of the invention.
Figure 6:
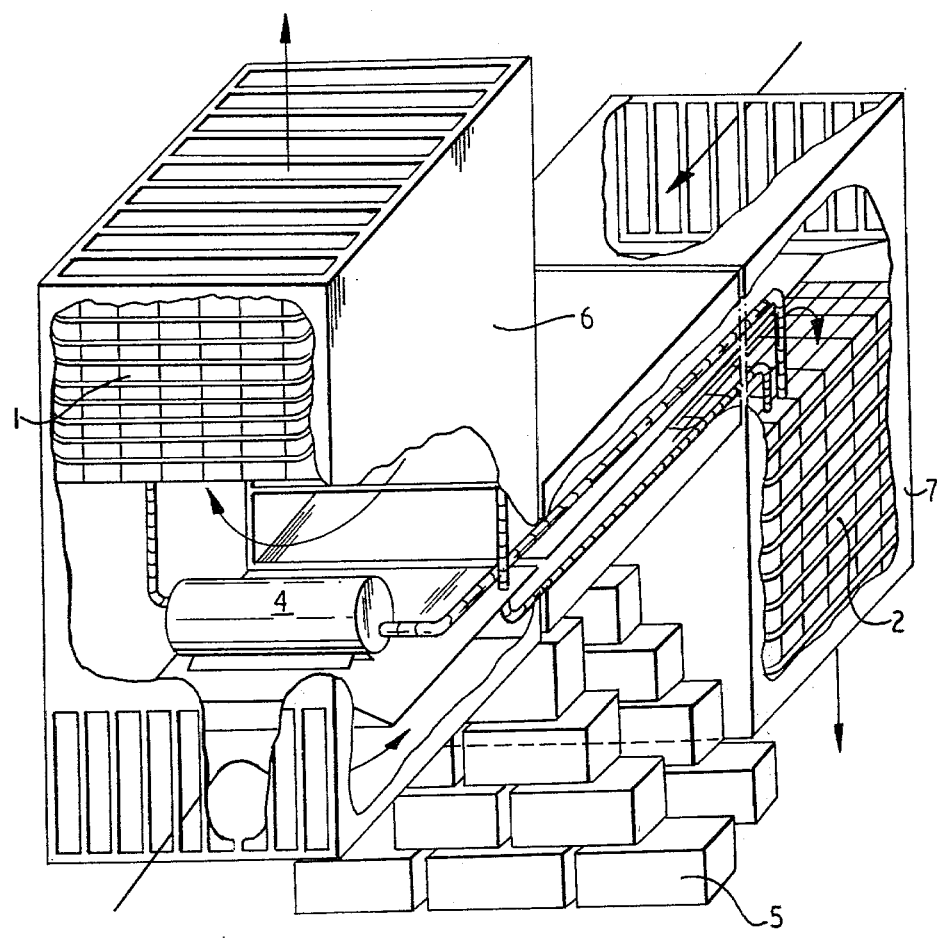

In FIGS. 5 and 6 the arrows show the direction of the air flows through the system. The condenser 1 and evaporator 2 are each in the form of a matrix with fins between which the air passes for maximum heat exchange.

Figure 7:
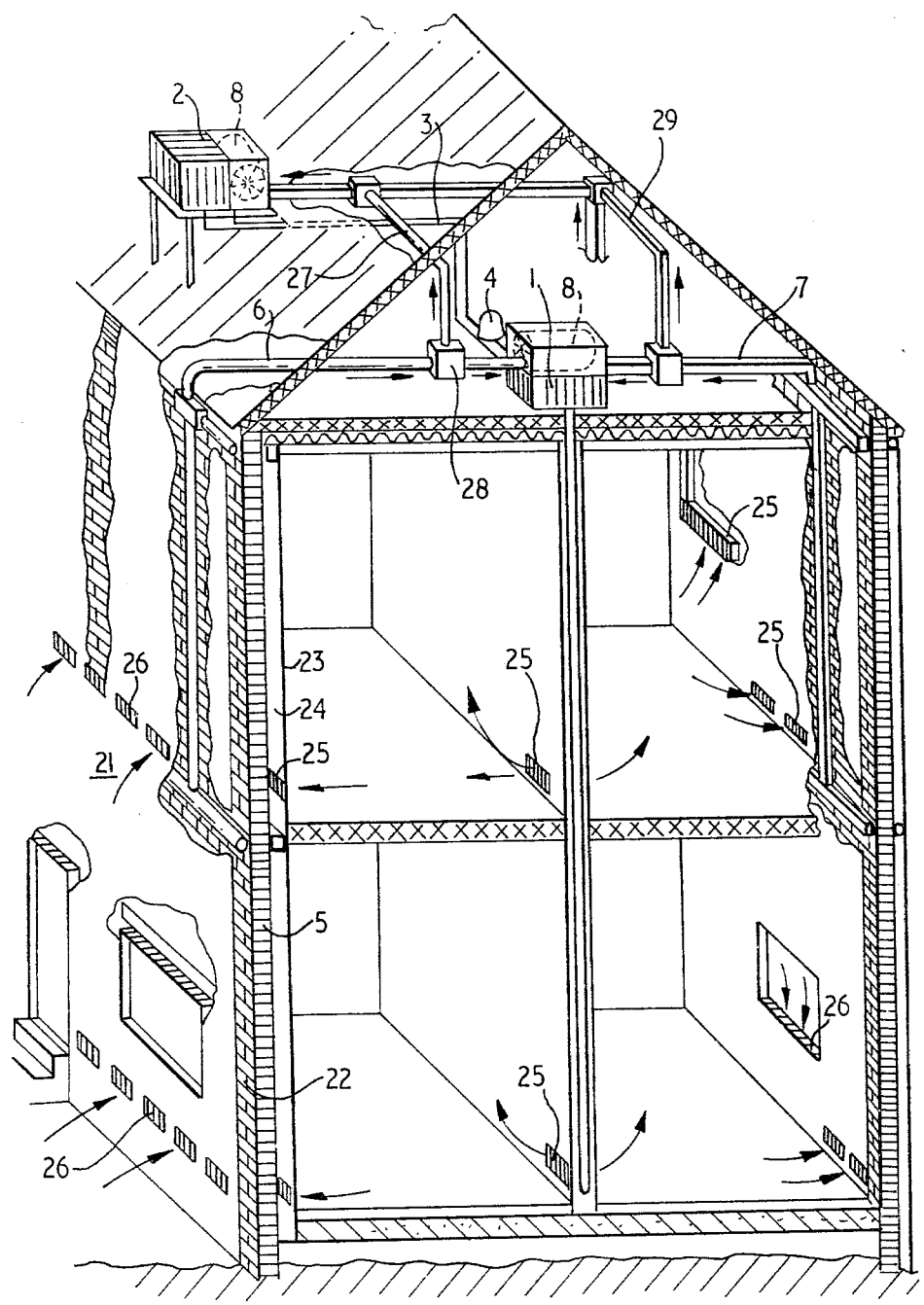
FIG. 7 is part-sectional perspective view of a building having a system of the invention.

In FIG. 7 the building has a solid facade outer wall 21 of glass reinforced plastics weatherboard and access to the air gap 22 is gained by means of grilles 26 in the wall 21 and at doors and windows. The air gaps 22 and 24 are about 50 mm wide. The refrigeration cycle is located in the loft of the building with the evaporator 2 external of the building on the roof. The ducting 6 and 7 is divided into various branches leading to and from different parts of the building. Insulation is provided at the roof of the building and below the floorboards. In FIG. 7 the inlet duct 6 and its branches are shown as round section pipe and the outlet duct 7 and its branches are shown as square section pipe, and the flow of air is shown by arrows.

A branch duct 27 is provided between the inlet duct 6 and outlet duct 7 between the inlet sides of the condenser 1 and evaporator 2, and a valve is located at the branch connection 28. Closure of this valve blocks off access to the condenser 1 and allows incoming air, preheated by heat exchange with the external wall 5, to pass along the branch duct 27 to the evaporator 2 without first passing through the condenser 1 or through the rooms of the building. The heat taken by this air from the wall 5 is then removed by the evaporator 2.

A further branch duct 28 extends between the outlet duct 7 and the condenser 1 with a further valve at that branch connection. When this valve is closed it blocks off the outlet duct 7 to the evaporator 2 and opens the branch duct 28, thus allowing recirculation of air within the building through the condenser 1.

When the valves are adjusted to open fully both branch ducts 27 and 28, therefore, heat is continuously taken from the outer face of the external wall 5 and transferred by the refrigeration cycle to the air circulating within the building, thus providing maximum heat retention in the building with air circulation.

The grilles 25 at the outlet end of the inlet ducting 6 are individually adjustable to allow a greater or lesser amount of heat into each room in the building, and the air velocity in the ducting is only about 1 m/sec thus representing a light breeze with no discomfort to occupants of the building.

In use, the system of FIG. 7 operates generally in the same manner as that of FIG. 4 with incoming and outgoing air being led into heat exchange relation with the external wall of the building before entering the ducts 6 and 7. The condenser 1 operates at 25° C. and the evaporator at −5° C. although an evaporator temperature lower than that of the outside air is sufficient. For very cold climates an optional auxiliary heating source can be included for heating recirculated air; electrical resistance or combustion of oil, gas or other fuel can be used for this purpose.

There are many advantages which accrue from the temperature control systems of these embodiments of the invention; for example:

1. Comfort is increased since the temperature the walls present to a room are almost equal to the room air temperature, with a consequent reduction in radiation losses by objects in the room and reduction in draughts and cold air currents. The "useable space" in the room is thus increased.

2. Running costs are a fraction (e.g. around one fifth) of the costs of conventional heating and ventilating systems to maintain the same conditions inside the building.

3. Interior environmental conditions are improved with fresh air ventilation, filtering, reduced odours and condensation, and increased comfort. The conditions of the fabric of the building are also improved.

4. The greatly reduced fuel requirements benefit the external environment. The heat losses to the external atmosphere are greatly reduced, but the cold air released has no effect as this is more than matched by the heat losses.

5. The relative proportions of fresh ventilation air and recirculated air can be varied depending on requirements and either one can be omitted. The system can also be used as a conventional air-to-air heat pump without air circulation in the cavities for rapid "warm-up".

6. The direction of air flow past the condenser and evaporator can be reversed to provide cooling instead of heating in summer conditions, or for the same purpose the system itself may be removed and replaced in reverse configuration.

I claim:

1. A method of ventilating and controlling the temperature of a space bounded by walling, the walling having an inner face and an outer face, comprising providing refrigeration apparatus having an evaporator section and a condenser section, guiding air from outside the space into heat exchange relationship with said outer face of the walling and thence past one of said sections and into the space, and simultaneously guiding air from inside the space into heat exchange relationship with said inner face of the walling and thence past the other of said sections and out of the space.

2. A system for ventilating and controlling the temperature of a space bounded by walling, the walling having an inner face and an outer face, the system comprising refrigeration apparatus having a condenser and an evaporator, first ducting extending through the walling and containing said condenser, second ducting extending through the walling and containing said evaporator, means for guiding air prior to entry into the first ducting into heat exchange relationship with one of said faces of the walling, and means for guiding air prior to entry into the second ducting into heat exchange relationship with the other of said faces of the walling.

3. A system according to claim 2, wherein the means for guiding the air are first and second partitions located in spaced relation to the inner and outer faces of the walling to define air gaps between each face and its respective partition.

4. A system according to claim 2 or 3, wherein the spaced bounded by the walling is divided into a plurality of apartments and the first and second ducting open into more than one of the apartments.

5. A system according to claim 2 or 3, wherein fans are provided in the first and second ducting for creating flows of air through the ducting.

6. A system according to claim 2 or 3, in the form of a self-contained unit disposed in an aperture in the walling.

7. A system according to claim 2 or 3, wherein the first and second ducting each has an inlet end and an outlet end and the compressor and evaporator of the refrigeration apparatus are each disposed at the outlet end of the respective ducting.

8. A system according to claim 2 or 3, wherein closure means are provided for the first and second ducting to selectively block passage of air through the ducting.

* * * * *